(12) United States Patent
Müller

(10) Patent No.: US 6,250,788 B1
(45) Date of Patent: Jun. 26, 2001

(54) MOTOR VEHICLE LIGHT ARRANGEMENT

(75) Inventor: Michael Müller, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/580,978

(22) Filed: May 30, 2000

Related U.S. Application Data

(63) Continuation of application No. PCT/EP98/07130, filed on Nov. 9, 1998.

(30) Foreign Application Priority Data

Nov. 29, 1997 (DE) ............................................... 197 53 096

(51) Int. Cl.$^7$ ................................................. F21W 101/14
(52) U.S. Cl. ......................... 362/541; 362/800; 362/499; 362/543; 362/545
(58) Field of Search ...................................... 362/800, 543, 362/544, 545, 540, 541, 505, 499

(56) References Cited

U.S. PATENT DOCUMENTS

| | | | |
|---|---|---|---|
| 4,835,666 | 5/1989 | Feger et al. ........................... | 362/268 |
| 5,036,248 | * 7/1991 | McEvan et al. .................. | 362/800 X |
| 5,268,828 | * 12/1993 | Miura ............................... | 362/800 X |
| 5,570,951 | * 11/1996 | Bertling et al. .................. | 362/545 X |
| 5,752,766 | * 5/1998 | Bailey et al. ..................... | 362/800 X |
| 5,808,592 | * 9/1998 | Mizutani et al. ................. | 362/800 X |
| 5,877,682 | * 3/1999 | Groeller ........................... | 362/545 X |

FOREIGN PATENT DOCUMENTS

| | | |
|---|---|---|
| 3930214 | 9/1989 | (DE) . |
| 3916875 | 12/1990 | (DE) . |
| 4206959 | 9/1993 | (DE) . |
| 2139340 | 11/1984 | (GB) . |
| 04015685 | 1/1992 | (JP) . |
| 10024766 | 1/1998 | (JP) . |

OTHER PUBLICATIONS

*Bauelemente der Optik, Taschenbuch der technischen Optik,* Naumann/Shcröder, Fifth Revised Edition, pp. 36–41.

* cited by examiner

Primary Examiner—Laura K. Tso
(74) *Attorney, Agent, or Firm*—Baker Botts L.L.P.

(57) ABSTRACT

A motor vehicle light arrangement includes a light having a first plurality of red light-emitting diodes distributed over the entire area of the light and other pluralities of light-emitting diodes of the same color, which may be red or another color, located in different functional regions of the light to indicate different motor vehicle conditions.

6 Claims, 1 Drawing Sheet

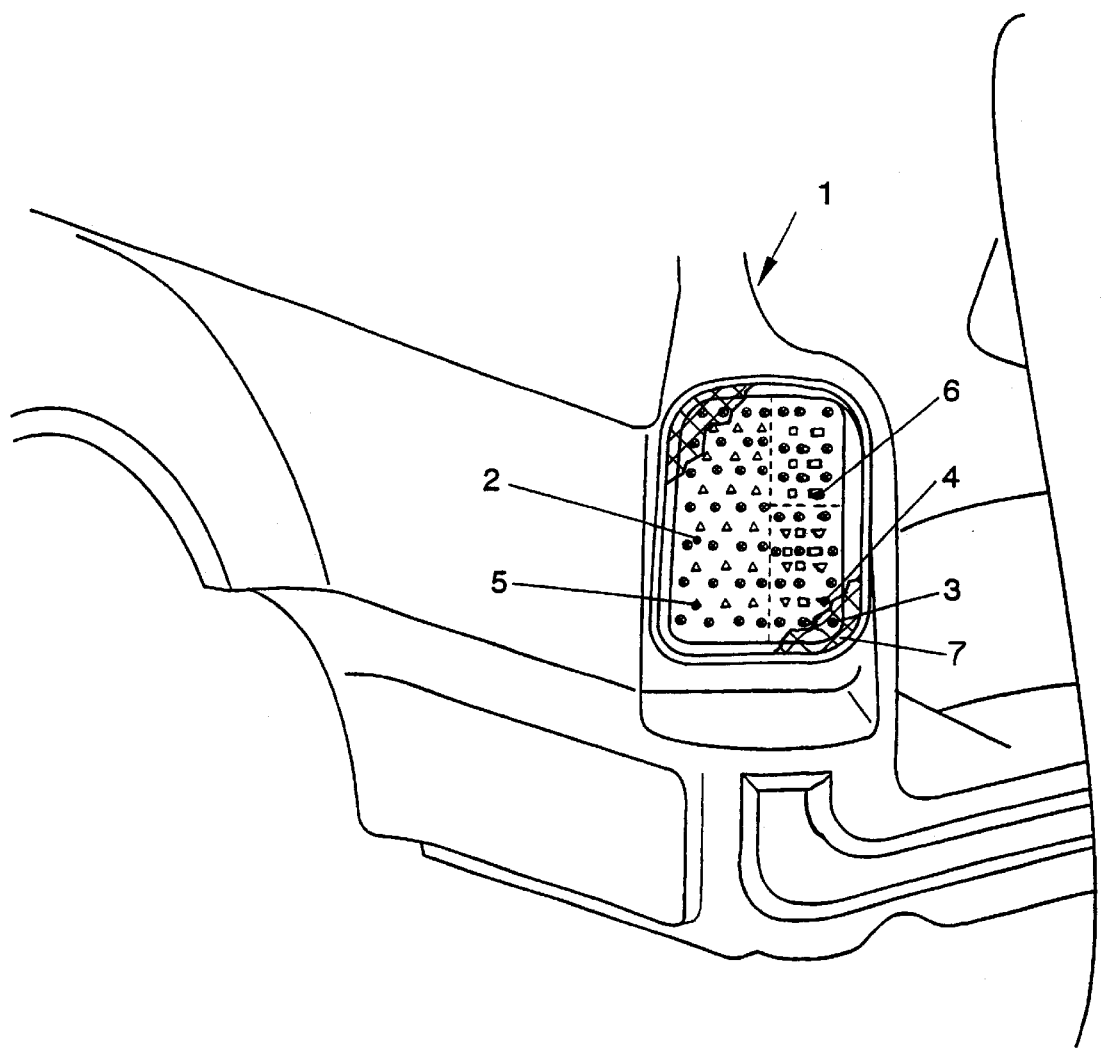

MOTOR VEHICLE LIGHT ARRANGEMENT

REFERENCE TO RELATED APPLICATION

This application is a continuation of International Application No. PCT/EP98/07130 filed Nov. 9, 1998.

BACKGROUND OF THE INVENTION

This invention relates to motor vehicle light arrangements having at least one functional surface and containing light-emitting diodes of uniform colors as light sources.

German Offenlegungsschrift No. 33 15 785 describes a motor vehicle light containing three-phase light-emitting diodes to produce white light and light of at least two different colors for different lighting and/or signaling functions and capable of being triggered to produce different colors by application of different voltages. A disadvantage of such a motor vehicle light, however, is that different control voltages are required to produce different lighting or signaling functions. In addition, various parts of the total lighting of the motor vehicle light must be separately actuatable so that special colors of light and/or different luminous intensities of signal colors can be produced.

German Offenlegungsschrift No. 39 16 875 discloses a multichamber signal light for motor vehicles which includes several functional fields containing light-emitting diodes of different colors. Thus, in the field corresponding to the directional indicator, only yellow light-emitting diodes are provided; in the field corresponding to the stop or brake light, there are only red light-emitting diodes; and in the field containing the reverse light, there are red, green and blue light-emitting diodes. Additive color mixture of the colors red, green and blue produces the white light necessary for the reverse light. This signal light is not distinguishable in appearance from conventional signal lights using incandescent bulbs. Further, each functional region of the light has only a single function so that, upon actuation of the brake or of the directional indicator, as the case may be, those light-emitting diodes which correspond to that particular function are actuated and the light-emitting diodes corresponding to the other functions are not actuated.

Other signal light arrangements using light-emitting diodes of various colors are disclosed in German Offenlegungsschrift No. 42 28 895. In those signal light arrangements, light-emitting diodes of various colors are combined in order to obtain white light for the reverse indicator. No special specific constructions of the lighting devices are disclosed in these references.

SUMMARY OF THE INVENTION

Accordingly, it is an object of the present invention to provide a motor vehicle light arrangement which overcomes disadvantages of the prior art.

Another object of the invention is to provide a motor vehicle light arrangement using light-emitting diodes having the lowest possible cost and simplest possible construction.

These and other objects of the invention are attained by providing a motor vehicle light arrangement having a light display area containing plurality of light-emitting diodes of the same color distributed over the light display area and having at least one functional region within the display area containing another plurality of light-emitting diodes of the same color to indicate a corresponding vehicle function.

The motor vehicle light may, for example, contain red light-emitting diodes distributed over the entire display area and assigned to a tail light function and at least one functional region within the entire area having a plurality of additional red light-emitting diodes for identifying various operating conditions of the vehicle, for example vehicle braking. The red light-emitting diodes assigned to the tail light function are thus utilized for the braking function as well, thereby minimizing the number of red light-emitting diodes required. In this way it is possible to provide a motor vehicle light arrangement with light-emitting diodes for at least two different functions with utmost economy.

Furthermore, the appearance of the light arrangement is advantageously improved, that is, the brake light lights up as a functional region of the light display area, thus producing a three-dimensional effect. This permits additional functional regions to be provided in the tail light that are not used for the brake light. In these additional functional regions, light-emitting diodes of another color may be provided. By using light-emitting diodes of another color, additive color mixture with the red light-emitting diodes of the red tail light produces other signal colors. Thus, as described in German Offenlegungsschrift No. 39 16 875, for example, the color yellow can be obtained by mixing red light with green light. Consequently, by providing additional green light-emitting diodes, a yellow function indicator can be obtained in a corresponding functional region.

Additionally, in another functional region, it is possible to add blue and green light-emitting diodes to the existing red light-emitting diodes, so that white light for the reverse indicator is obtained by additive color mixing.

Light-emitting diodes emit a highly monochromatic and directed light. To obtain a harmonious appearance of the motor vehicle light, it may advantageously be covered with a diffuser.

In one embodiment, if the tail light is actuated, the entire area of the light arrangement will show red homogeneously. Upon actuation of additional functions, such as for example the brake or the directional indicator or the reverse gear, a brake light functional region, a directional indicator functional region or a reverse indicator functional region will light up within the homogeneously luminescent motor vehicle light upon actuation of the additional light-emitting diodes, providing a three-dimensional effect, since these additional functions produce an enhanced luminous intensity because of the additional light-emitting diodes.

BRIEF DESCRIPTION OF THE DRAWING

Further objects and advantages of the invention will be apparent from a reading of the following description in conjunction with the accompanying single drawing FIGURE which is a schematic fragmentary illustration of a motor vehicle containing a representative embodiment of a motor vehicle light arrangement according to the invention.

DESCRIPTION OF PREFERRED EMBODIMENTS

In the typical embodiment of the invention shown in the drawing, a motor vehicle light 2 is mounted in a motor vehicle 1. The motor vehicle light 2 contains a plurality of red light-emitting diodes 3 distributed throughout its entire area. Upon actuation of the tail light, all of the red light-emitting diodes 3 are lighted, providing the motor vehicle light 2 with a homogenous red appearance.

In addition, the motor vehicle light 2 includes a further plurality of red light-emitting diodes 5 located in a functional region which, as indicated by the vertical dash lines, is only a part of the total tail light area, to identify various operating conditions of the vehicle. For example, the region containing the additional red light-emitting diodes may constitute the brake light or, in the USA for example, a directional signal as well.

By providing the additional red light-emitting diodes 5, therefore, an enhanced additional luminous intensity in the corresponding region is provided. If the brake is actuated with the tail light on, then the brake light will shine out from the tail light, producing a three-dimensional effect. Advantageously, the red light-emitting diodes 5, when illuminated, provide the requisite luminous intensity for the brake light. Also, a plurality of green light-emitting diodes 6 are provided in another functional region of the motor vehicle light as indicated by the vertical dash lines. The green light-emitting diodes 6 and the red light-emitting diodes 3 in that functional region produce yellow light by additive color mixture. The reverse white light is advantageously created by providing a plurality of blue light-emitting diodes 4 in a lower part of that functional region as denoted by the horizontal dash line, thereby producing white light by additive color mixture of the blue light-emitting diodes 4, the green light-emitting diodes 6 and the red light-emitting diodes 3. It would be possible, for example, to provide the reverse light and the directional indicator together in one functional region, in which case the directional indicator could be obtained by actuating the green light-emitting diodes 6, and the reverse light by actuating the green light-emitting diodes 6 and the blue light-emitting diodes 4, in addition to the red light-emitting diodes 3 located in that region. Of course, two separate functional regions may also be provided, in which case fewer blue light-emitting diodes 4 would be needed since they are necessary for the reverse light only. The exit opening in the motor vehicle for the light from the diodes may be covered by an optical diffuser 7. As to the choice of light-emitting diodes, reference may be made to the book *Bauelemente der Optik* [Optical Components] by Normann/Schröder, 5th revised edition, Karl Hansa Verlag 1987, pages 37–41. Appropriate light-emitting diodes producing light of the required wavelengths are readily available commercially.

Although the invention has been described herein with reference to specific embodiments, many modifications and variations therein will readily occur to those skilled in the art. Accordingly, all such variations and modifications are included within the intended scope of the invention.

I claim:

1. A motor vehicle light arrangement comprising a light having a light display area containing a first plurality of light-emitting diodes of a same color distributed over the entire light display area to indicate a first operating condition of the vehicle, and at least one functional region within the light display area containing a second plurality of light-emitting diodes of a same color additional to and interspersed between the diodes of the first plurality in that region to indicate a second operating condition of the vehicle and provide closer spacing between diodes in that region to produce enhanced luminous intensity in that region when the diodes of the second plurality are illuminated in combination with the diodes of the first plurality.

2. A motor vehicle light arrangement according to claim 1 wherein the color of the second plurality of light-emitting diodes is the same as that of the first plurality of light-emitting diodes.

3. A motor vehicle light arrangement according to claim 1 wherein the color of the second plurality of light-emitting diodes is different from that of the first plurality of light-emitting diodes.

4. A motor vehicle light arrangement according to claim 1 including a further functional region within the display area containing a third plurality of light-emitting diodes of a different color from that of either the first plurality of light-emitting diodes or the second plurality of light-emitting diodes.

5. A motor vehicle light arrangement according to claim 1 including an optical diffuser covering an exit opening for the motor vehicle light arrangement.

6. A motor vehicle light arrangement according to claim 1 wherein the first plurality of light-emitting diodes comprises red light-emitting diodes which are associated with a common function, and including a plurality of further functional regions in which additional pluralities light-emitting diodes of different colors are provided, the actuation of each additional plurality of light-emitting diodes being capable of producing an additional signal color by additive color mixture of the additional light-emitting diodes and the red light-emitting diodes.

\* \* \* \* \*